US012773780B2

(12) United States Patent
Kim

(10) Patent No.: US 12,773,780 B2
(45) **Date of Patent: *Oct. 27, 2026**

(54) TRANSPORT ROBOT CAPABLE OF REMOVING DYNAMIC OBSTACLE AND METHOD FOR REMOVING DYNAMIC OBSTACLE

(71) Applicant: TWINNY CO., LTD., Daejeon (KR)

(72) Inventor: Jun Hyung Kim, Daejeon (KR)

(73) Assignee: TWINNY CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/851,759

(22) PCT Filed: Dec. 13, 2022

(86) PCT No.: PCT/KR2022/020211

§ 371 (c)(1),
(2) Date: Jan. 31, 2025

(87) PCT Pub. No.: WO2024/038971

PCT Pub. Date: Feb. 22, 2024

(65) Prior Publication Data

US 2025/0162148 A1 May 22, 2025

(30) Foreign Application Priority Data

Aug. 19, 2022 (KR) ........................ 10-2022-0103887

(51) Int. Cl.
*B25J 9/16* (2006.01)
*B25J 5/00* (2006.01)
(Continued)

(52) U.S. Cl.
CPC ............. *B25J 9/1664* (2013.01); *B25J 5/007* (2013.01); *B25J 19/022* (2013.01); *G01C 21/383* (2020.08); *G01C 21/3837* (2020.08)

(58) Field of Classification Search
CPC ........ B25J 9/1664; B25J 5/007; B25J 19/022; G05D 1/024; B60W 2420/408;
(Continued)

(56) References Cited

U.S. PATENT DOCUMENTS 8,306,738 B2 11/2012 Kong
2018/0120116 A1* 5/2018 Rombouts ............... G01S 17/89
2023/0213664 A1* 7/2023 Kulkarni ............... G01S 13/865
342/357.31

FOREIGN PATENT DOCUMENTS

JP 5410795 2/2014
KR 20180059188 A 6/2018
(Continued)

OTHER PUBLICATIONS

Korean Office Action (including English translation) issued in App. No. KR20220103887, dated Nov. 18, 2022, 6 pages.

*Primary Examiner* — Spencer D Patton
(74) *Attorney, Agent, or Firm* — Blueshift IP; Robert Plotkin

(57) ABSTRACT

The present invention relates to a robot capable of autonomous traveling without mistaking a temporary obstacle as part of a fixed environment, and a dynamic obstacle removal method for the robot. A transport robot capable of removing a dynamic obstacle, according to the present invention, comprises: a body part (100); a transport unit (200) for moving the body part under the control of the body part; and a lidar unit (300) that emits light, detects the light reflected by an object in a global space to generate lidar scan data, and transmits the lidar scan data to the body part (100).

4 Claims, 11 Drawing Sheets

(51) Int. Cl.
*B25J 19/02* (2006.01)
*G01C 21/00* (2006.01)

(58) Field of Classification Search
CPC ...... B60W 2554/40; B60W 2554/4041; G01C 21/3804; G01C 21/3807; G01C 21/383; G01C 21/3833; G01C 21/3837; G01C 21/3848
See application file for complete search history.

(56) References Cited

FOREIGN PATENT DOCUMENTS

| | | | |
|---|---|---|---|
| KR | 20190077481 | A | 7/2019 |
| KR | 20220000331 | A | 1/2022 |
| KR | 20220064913 | A | 5/2022 |

* cited by examiner

TRANSPORT ROBOT CAPABLE OF REMOVING DYNAMIC OBSTACLE AND METHOD FOR REMOVING DYNAMIC OBSTACLE

TECHNICAL FIELD

The present disclosure relates to an autonomous traveling robot and a map generating method, and more specifically, to a robot capable of autonomous traveling without mistaking a temporary obstacle for a fixed environment and a dynamic obstacle removal method for the robot.

BACKGROUND ART

In large stores or factories (hereinafter referred to as "workspaces"), many types of products should be moved frequently. Since it is inefficient for human to move products without using tools or devices, the power of human-driven devices such as tools such as carts, forklifts, and pallet devices (hereinafter referred to as "transport devices, etc.") has been conventionally used, but recently, with the development of related technologies such as an image recognition technology, a sensor technology, and a robot control technology, transport robots that transport products to their destination by themselves without human intervention are emerging.

To determine a route that the robot reaches a destination, it is necessary to know a current location of the robot, locations of nearby obstacles, and other terrain and features, and such location estimation and generation of a map of the surroundings are referred to as simultaneous localization and mapping (SLAM).

Such a SLAM technique becomes more useful in environments in which it is difficult to provide a map of a workspace or it is difficult to provide a map of a fixed workspace because a structure of the workspace is not constant, and since people frequently move or the loading of temporary objects occurs frequently in a workspace in which a transport robot moves in many cases, when a general SLAM algorithm is applied, a dynamic obstacle such as a worker is recognized as a fixed environment, resulting in a problem that the transport robot adopts an unnecessary avoidance route, fails to find a route, or inaccurately estimates a location. Therefore, there is a need to remove dynamic obstacles, and an example thereof is disclosed in "Patent Document 1."

FIG. 1 is a flowchart of a method of removing a dynamic obstacle in SLAM disclosed in Patent Document 1, and FIG. 2 is a cell conceptual diagram for describing key points thereof.

The method of removing the dynamic obstacle in the conventional SLAM includes partitioning a three-dimensional space into a preset size, for example, a cell of 3 cm×3 cm×3 cm (length×width>height) and updating tracking information of a cell acquired from a sensor of a robot for each cell of a map (S1), determining whether the cell corresponds to a dynamic obstacle based on accumulated detection time information and tracking information for each cell (S3), and removing data corresponding to the cell detected as the dynamic obstacle from the map (S5).

In the method of removing the dynamic obstacle in the conventional SLAM, the tracking information is composed of first tracking information representing the number of times a laser focuses on a cell and second tracking information representing the number of times the laser passes through the cell, and as shown in FIG. 2, after increasing the second tracking information for the cell through which the laser has passed and increasing the first tracking information for the cell on which the laser has focused, whether the cell is the dynamic obstacle is determined according to whether an obstacle existence probability and a first tracking information value are each a set reference value or less.

However, in the method of removing the dynamic obstacle in the conventional SLAM, since all pieces of tracking information for the cell through which the laser passes and the cell on which the laser focuses should be stored, data should accumulate even for an empty space with little tracking information, resulting in a problem that the throughout and storage of data increase in proportion to the size of the workspace, that is, a problem of data processing that is proportional to three squares of a length.

DISCLOSURE

Patent Document (Patent Document 1) KR 10-2022-0064913 A (2022.05.19.)

Technical Problem

The present disclosure has been made in efforts to solve the problems and is directed to providing a transport robot capable of removing a dynamic obstacle while reducing generation and throughout of data and a method thereof.

Technical Solution

According to the present disclosure, there is provided a transport robot capable of removing a dynamic obstacle comprising a body part, a transport part configured to move the body part according to control of the body part, and a light detection and ranging (LiDAR) part configured to emit light, detect light in which the emitted light is reflected from an object in a global space, generate LiDAR scan data, and transmit to the body part, wherein the body part includes a PC configured to generate a map of a workspace in which the transport robot is located, and the PC includes, a node generation module configured to generate a new node when a change in location or direction of the transport robot is a predetermined value or more, a motion constraint calculation module configured to calculate a motion constraint for a previous node with respect to the generated nodes, a loop constraint calculation module configured to calculate a loop constraint for a past node when the past node having an Euclidean distance that is a predetermined value or less with respect to the generated nodes is present, a node pose optimization module configured to optimize poses of nodes using both end node information forming the loop, a LiDAR data transformation and accumulation module configured to transform three-dimensional LiDAR scan data of the optimized node into location and direction data of an initial node and accumulate the transformed location and direction data, a depth image generation module configured to generate a depth image by processing LiDAR scan data with respect to each of the accumulated nodes, a matching module configured to compare map points accumulated on a map with map points newly accumulated by the LiDAR scan data and distinguish a matched map point from an unmatched map point, a projection module configured to project the unmatched map point onto a depth image by LiDAR scan generating the newly added map point and determine whether a weight is subtracted, a weight adjustment module configured to increase and decrease weights of the matched map point and the unmatched map point according to the determination of the matching module and the projection module and assign an initial weight to map points that do not match the map points accumulated as the newly accumulated points, and a map generation module configured to return the remaining map points while the LiDAR data transformation and accumulation module to the projection module are repeatedly performed.

Advantageous Effects

In the present disclosure, since the map points are generated on only the boundaries of the workspace, even when the three-dimensional workspace is scanned, data processing proportional to the wall surface, that is, the square of the length is required, thereby significantly reducing the map generation time compared to the related art.

In addition, since whether the map point is a dynamic obstacle is determined through the projection onto the depth image, a case where the determining of whether the map point is the dynamic obstacle is not possible can be separated separately, thereby lowering the possibility of incorrectly determining that the fixed obstacle is the dynamic obstacle or the dynamic obstacle is the fixed obstacle.

MODE FOR INVENTION

Hereinafter, a transport robot capable of avoiding a dynamic obstacle and a method of removing the dynamic obstacle according to the present disclosure will be described in detail with reference to the accompanying drawings.

Figure 1:
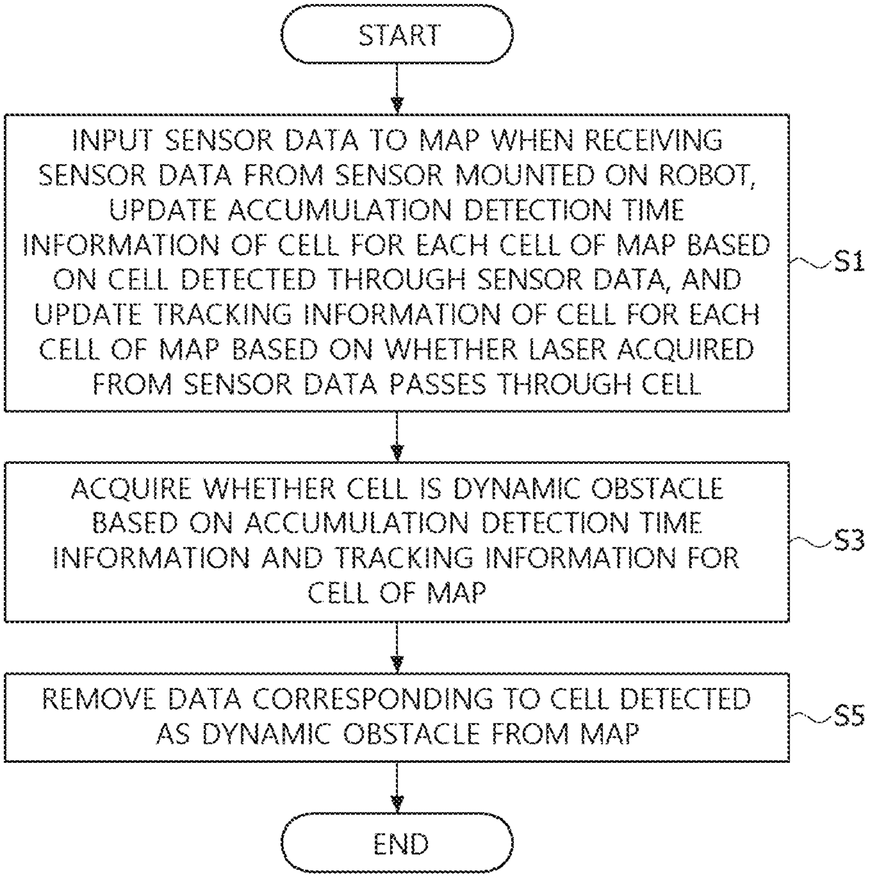
FIG. 1 is flowchart of a method of removing a dynamic obstacle in the SLAM disclosed in Patent Document 1.
Figure 2:
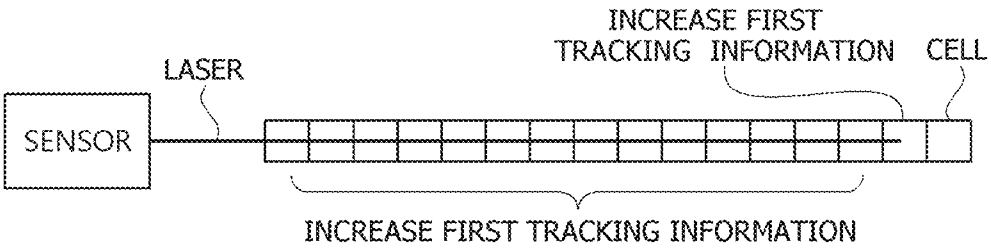
FIG. 2 is a cell conceptual diagram for describing key points thereof.
Figure 3:
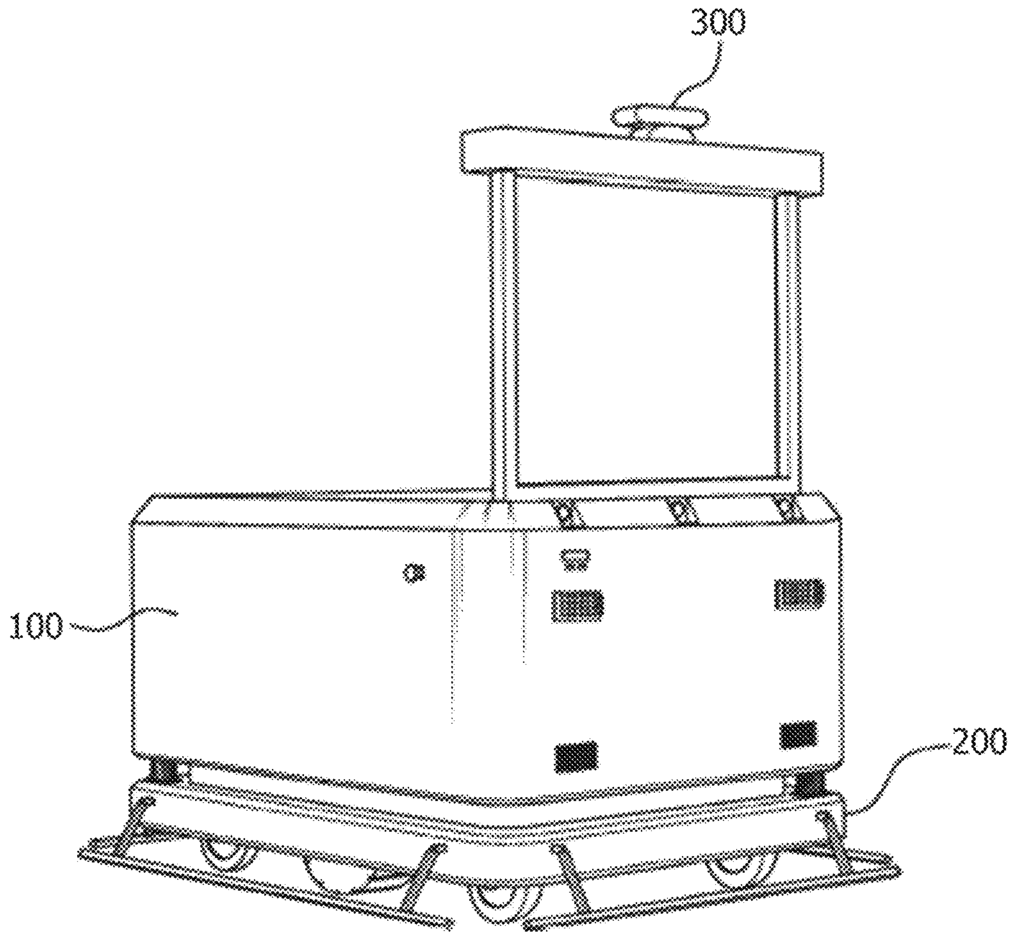
FIG. 3 is a perspective view of a transport robot capable of removing a dynamic obstacle according to the present disclosure.
Figure 4:
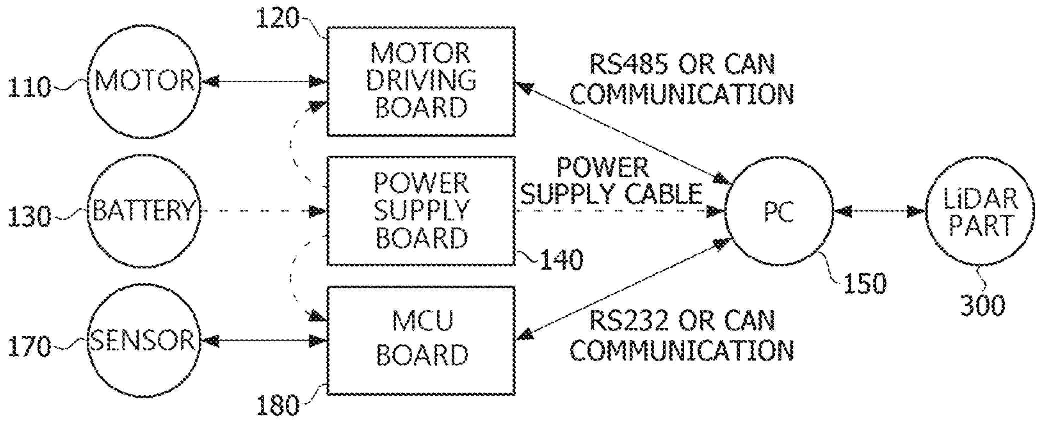
FIG. 4 is a configuration diagram of the transport robot capable of removing the dynamic obstacle according to the present disclosure.

FIG. 3 is a perspective view of a transport robot capable of removing a dynamic obstacle according to the present disclosure, and FIG. 4 is a configuration diagram of the transport robot capable of removing the dynamic obstacle according to the present disclosure. The transport robot capable of removing a dynamic obstacle according to the present disclosure includes a body part 100, a transport part 200 for moving the body part 100, and a light and ranging (LiDAR) part 300 provided on the body part 100, in which when the LiDAR part 300 detects a wall or obstacle in a three-dimensional space and generates three-dimensional scan LiDAR data, the body part 100 estimates a location and direction (hereinafter referred to as "pose") using an odometry of the LiDAR scan data and generates a map, and the transport part 200 moves the body part 100 according to a control command. In the present disclosure, a location of the transport robot is basically defined as one point (x, y, z) in the X-Y-Z three-dimensional space coordinate system, and a direction thereof is defined as a roll, pitch, or yaw that is an angle tilted in a specific direction of the X-Y-Z three-dimensional space coordinate system, for example, with respect to X, Y, or Z-axis. Therefore, a pose of the transport robot can be represented by x, y, z, roll, pitch, and yaw. When the transport robot moves only on a plane, a location can be defined as one point (x, y) in the X-Y two-dimensional plane coordinate system, and a direction can be defined as an azimuth angle θ using the Z-axis of the X-Y-Z three-dimensional space coordinate system as a rotational axis. Hereinafter, a case where the pose corresponds to the three-dimensional space coordinates will be mainly described.

The body part 100 is a component for generating a three-dimensional map of a workspace in which the transport robot capable of removing the dynamic obstacle according to the present disclosure moves by processing the three-dimensional LiDAR scan data collected by the LiDAR part 300.

The transport part 200 is a component that is composed of wheels, caterpillars, etc. to transport the body part 100 under the control of the body part 100.

The LiDAR part 300 is a component for emitting light, detecting light reflected from an object in a global space, and transmitting the reflected light to the body part 100 and generates three-dimensional LiDAR scan data using light reflected from a wall, an obstacle, etc.

The body part 100 may include a motor 110 for generating the movement necessary for robot movement, such as wheels or caterpillars, a motor driving board 120 for controlling the motor 110, a battery 130, a power supply board 140 for controlling the battery, and a PC 150 for receiving the three-dimensional LiDAR scan data from the LiDAR part 300 and generating a map of a workspace in which the transport robot is located and may further include a sensor 170 such as an infrared sensor or an ultrasonic sensor and an MCU board 180 for collecting data sensed by the sensor 170. Data and control commands may be transmitted and received between the PC 150, the motor driving board 120, and the MCU board 180 using a method such as RS232 or CAN communication.

The PC 150 may process the three-dimensional LiDAR scan data and generate a three-dimensional map, and such map generation may be performed through firmware or software. In the present disclosure, the concept of a module (which may be implemented in hardware or software, but hardware and software are the same in terms of the technical spirit, and thus are not distinguished neither) may be introduced without distinguishing firmware and software.

Figure 5:
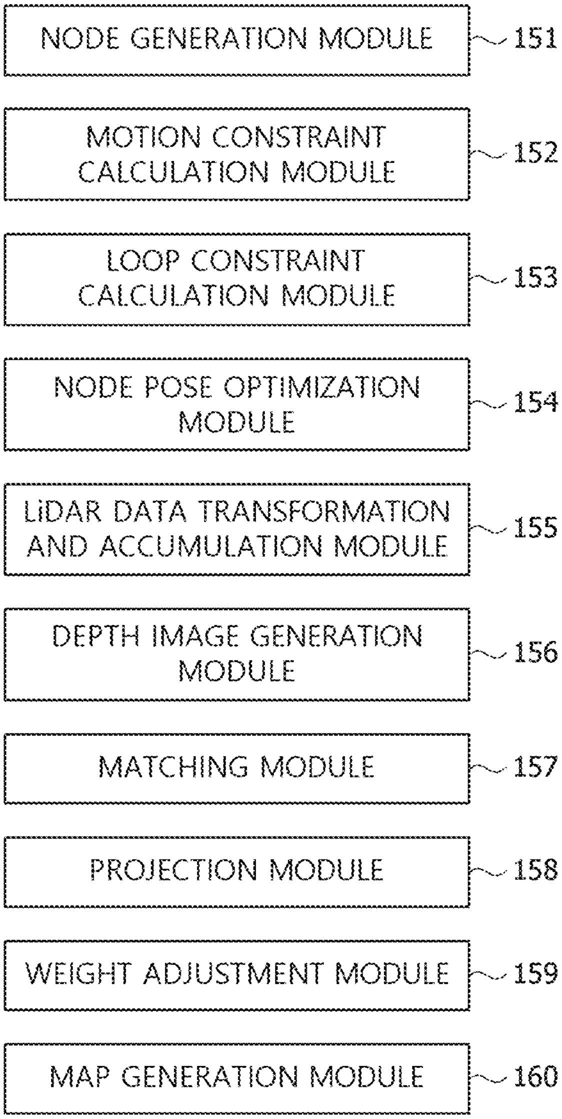
FIG. 5 is a configuration diagram of a module assembly for generating a map in a PC.
Figure 6:
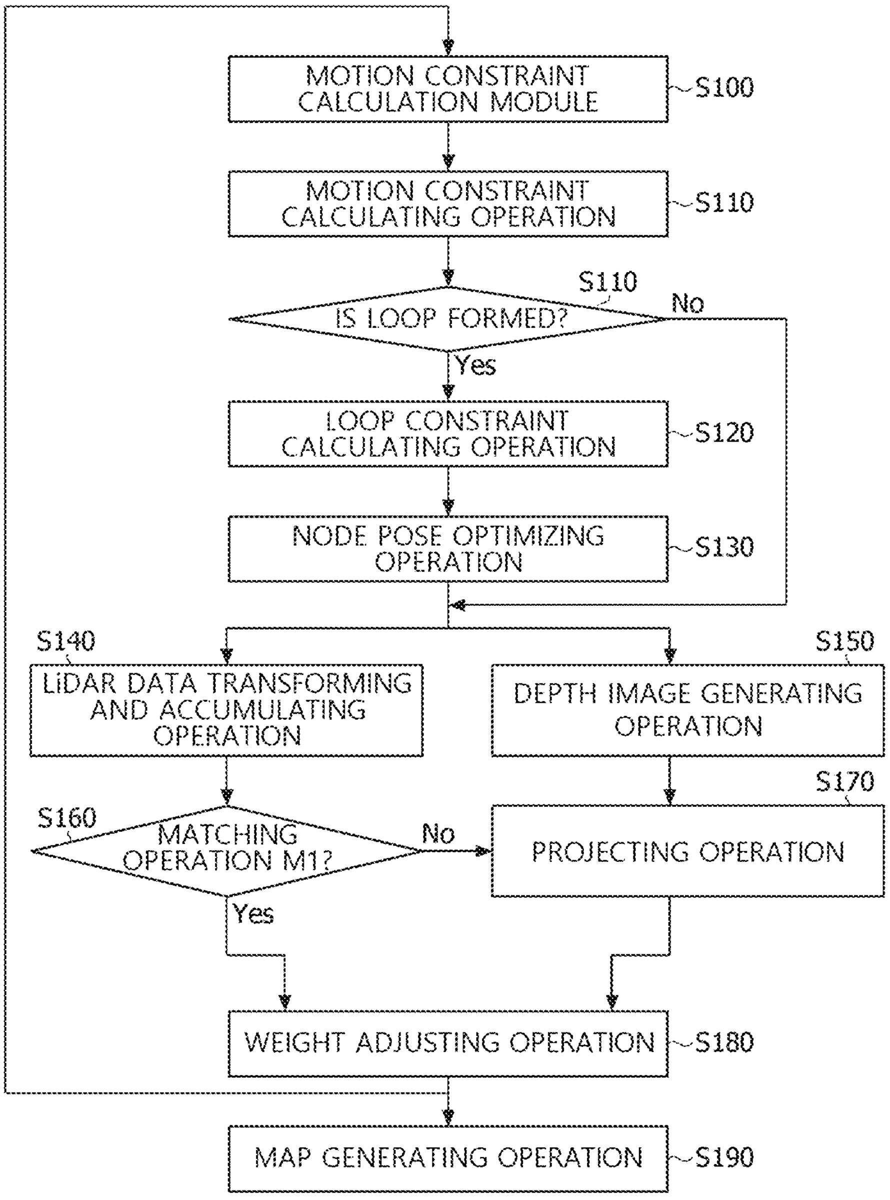
FIG. 6 is a flowchart of a map generating method performed in each module.

FIG. 5 is a configuration diagram of a module assembly for generating a map in a PC, and FIG. 6 is a flowchart of a map generating method performed in each module. FIG. 6 is a flowchart of the method of removing the dynamic obstacle according to the present disclosure.

In the present invention, the PC 150 includes a node generation module 151, a motion constraint calculation module 152, a loop constraint calculation module 153, a node pose optimization module 154, a LiDAR data transformation and accumulation module 155, a depth image generation module 156, a matching module 157, a projection module

158, and a three-dimensional map generation module 160.

The node generation module 151 is a component for performing a node generating operation (S100) of generating a new node when a change in pose of the transport robot exceeds a predetermined value or more, and in the present invention, the pose (x, y, z, roll, pitch, yaw) of the robot is composed of elements (x, y, z) related to translational movement and elements (roll, pitch, yaw) related to rotational movement, in which since any one of x, y, and z cannot be considered dominant and they are symmetrical, a case where a change in location in the three-dimensional space A (x, y, z) of the robot is greater than or equal to a first threshold, or a change in direction in the three-dimensional plane A (roll, pitch, yaw) of the robot is greater than or equal to a second threshold becomes conditions in which the new node is generated. Therefore, when only the location of the robot is moved by the first threshold or more in a state in which the direction is maintained, only a change in direction of the robot is the second threshold or more in a state in which the location is maintained, or the location and direction are both changed and changes in one or more of two are each threshold or more, a node is generated. The change in direction A (roll, pitch, yaw) may be obtained as a difference in the robot's gaze direction, and the change in location A (x, y, z) may be obtained as an Euclidean distance between two points in a three-dimensional coordinate system. In the present disclosure, a node is defined as the robot's pose and a set of pieces of three-dimensional LIDAR data measured at the corresponding pose.

The motion constraint calculation module 152 is a component for performing a motion constraint calculating operation (S110) of calculating a motion constraint for a previous node with respect to generated nodes. The motion constraint corresponds to a change in robot's pose, and in the present disclosure, the robot's pose may be derived through a LiDAR odometry that generates a current relative location for an initial location of the robot using scan matching. That is, when LiDAR scan data is generated at a $j^{th}$ LiDAR scan point, a LiDAR odometry Podom may be derived by finding the coordinate movement and rotation that allow the generated LiDAR data to overlap LiDAR data generated at the initial location, and a three-dimensional space may be observed at an initial pose by returning pieces of LiDAR scan data of a plurality of LiDAR scan points to the initial location. The LiDAR odometry Podom is a 4×4 matrix including a 3×3 matrix representing rotational transformation R and a 3×1 matrix representing translational transformation T and is represented by [Equation 1] below.

$$P_{odom} = \begin{pmatrix} R & T \\ 0 & 1 \end{pmatrix} \quad \text{[Equation 1]}$$

When a node is generated in the node generating operation (S100), a motion constraint with a previous node may be generated. When an odometry of an $n^{th}$ node is $P_{odom,n}$ and an odometry of an $n-1^{th}$ node is $P_{odom,n-1}$, a motion constraint $f_{n|n-1}$ may be obtained using [Equation 2] below. In [Equation 2], to vector is an operator for extracting a pose vector (x, y, z, roll, pitch, yaw) from the LiDAR odometry Podom.

$$f_{n|n-1} = \text{to\_vector}\left(P_{odom,n-1}^{-1} \times P_{odom,n}\right) \quad \text{[Equation 2]}$$

The nodes and motion constraints generated in the node generating operation (S100) and the motion constraint calculating operation (S110) are accumulated while the transport robot moves, and in the case of a closed workspace or in many cases even when the workspace is not closed, the robot revisits nodes that have been visited in the past. This case is called forming a loop, which means that when the nodes are connected, it becomes a closed type.

The loop constraint calculation module 153 is a component for performing the loop constraint calculating operation (S120) of calculating loop constraints for nodes with the same past location with respect to the generated nodes. Calculation conditions for the loop constraint is that locations between two nodes are the same with respect to at least the second previous node (this is because a line segment with the previous node is formed, and thus it is difficult to say that they have a loop constraint relationship). For example, to allow the $i^{th}$ node to have the loop constraint relationship with the $j^{th}$ node (node after the $i^{th}$ node), the relationship that j≥+2 and locations of the $i^{th}$ node and the $j^{th}$ node are $(x, y, z)_i=(x, y, z)_j$ should be established.

However, such identity of location theoretically assumes an ideal case, and in reality, it is more realistic to be considered as forming a loop when the $i^{th}$ node (x, y, z)i is located near the $j^{th}$ node (x, y, z)j. The "near" can be defined as an Euclidean distance between the $i^{th}$ node (x, y, z)i and the $j^{th}$ node (x, y, z)j being a predetermined value or less, and in a workspace in which people work together, it is appropriate that a range of "near" is experimentally 2 m or less.

The loop constraint corresponds to a change in pose of a robot at a current node and pose of the robot at a past node at a time point when the loop has been formed, and the deriving method differs from that of the motion constraint. The motion constraint obtains a change in node pose based on a state returned to an initial location, but the loop constraint directly (without returned to a reference point) derives a change in poses between two end nodes forming a loop, that is, a past node and a revisited node. That is, a difference $m_{j|i}$ between the poses of the $i^{th}$ node and the $j^{th}$ node is directly derived through scan matching. In addition, node optimization becomes possible due to a difference in these constraint deriving methods.

Since a current node location is located at a location that is the same as (or near) a past node location when a loop is formed, a motion constraint (return to a reference point) does not match a loop constraint (non-return to the reference point), and thus the node pose optimization module 154 may perform a node pose optimization operation (S130) of optimizing a pose of a node using both end node information forming the loop. In the present disclosure, the node optimization is performed by minimizing the sum of pose differences between nodes connected by a motion constraint, a loop constraint, and the motion and loop constraints. For example, when node information is accumulated from a $0^{th}$ node (initial node) to an $n^{th}$ node, a pose difference error between the nodes connected by the motion constraint, the loop constraint value, and the motion and loop constraints can be represented by [Equation 3], and node pose optimization is achieved by finding $\{P_0, P_1, \ldots, P_n\}$ that minimizes [Equation 3] (however, $\Omega$ denotes a covariance matrix for $P_0$, R denotes a covariance matrix between motions constraints, and S denotes a covariance matrix between loop constraints, and in the case of a three-dimensional space, all are a 6×6 matrix).

[Equation 3]

$$\text{error} = \text{to\_vector}(P_0^T)\cdot\Omega\cdot\text{to\_vector}(P_0) + \sum_{k=1}^{n}\left(\text{to\_vector}(P_{k-1}^{-1}\cdot P_k) - f_{k|k-1}\right)^T R^{-1}\left(\text{to\_vector}(P_{k-1}^{-1}\cdot P_k) - f_{k|k-1}\right) + \sum_{i,j}^{loop}\left(\text{to\_vector}(P_i^{-1}\cdot P_j) - m_{j|i}\right)^T S^{-1}\left(\text{to\_vector}(P_i^{-1}\cdot P_j) - m_{j|i}\right)$$

Figure 7:
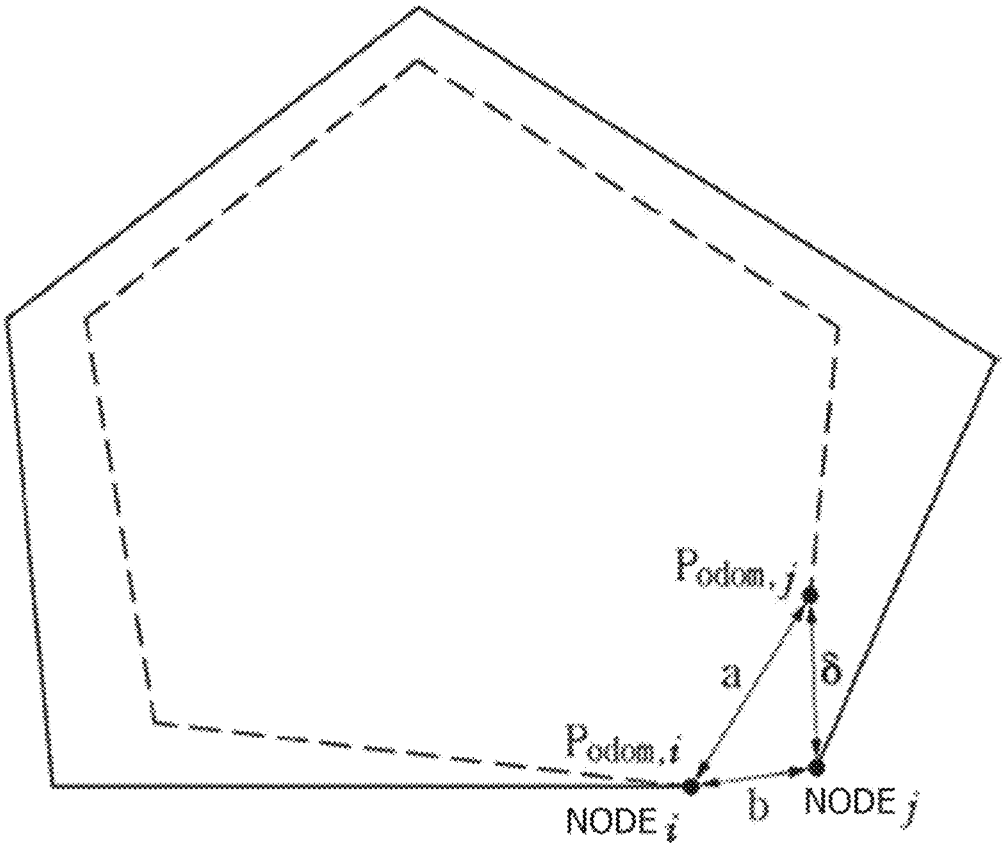
FIG. 7 is an exemplary view of a motion constraint and a loop constraint from an $i^{th}$ node to a $j^{th}$ node.

FIG. 7 is an exemplary view of a motion constraint and a loop constraint from an $i^{th}$ node to a $j^{th}$ node, in which the motion constraint is marked by dotted lines and an actual movement route of a robot is marked by solid lines. As described above, since the motion constraint is based on the odometry estimated after returned to the reference point, there may be a difference from an actual movement route of the robot, and as a result, there is a difference of $\delta$ between a constraint a between the $i^{th}$ node and the $j^{th}$ node derived from the motion constraint and a constraint b between the $i^{th}$ node and the $j^{th}$ node derived from the loop constraint, and the minimization of such a difference corresponds to optimization according to [Equation 3].

The LiDAR data transformation and accumulation module 155 is a component for performing a LiDAR data transforming and accumulating operation (S140) of transforming three-dimensional LiDAR scan data of an optimized node into pose data of an initial node and accumulating the transformed pose data. In the case of the initial node, since a pose of the initial node may be a reference pose (origin that enables comparison by returning each node), the initial node may be added directly without any additional transformation. When the reference pose is set differently from the initial node, the initial node also needs to be transformed according to the relationship with the reference pose. Coordinates of $j^{th}$ LiDAR scan data viewed from the reference pose may be calculated using Equation 4 below $\{P_j$ is a pose of the $j^{th}$ node, and (x, y, z) are coordinates of a LiDAR scanned point$\}$.

[Equation 4]

$$\begin{pmatrix} x' \\ y' \\ z' \\ 1 \end{pmatrix} = P_j \cdot \begin{pmatrix} x \\ y \\ z \\ 1 \end{pmatrix}$$

Figure 8:
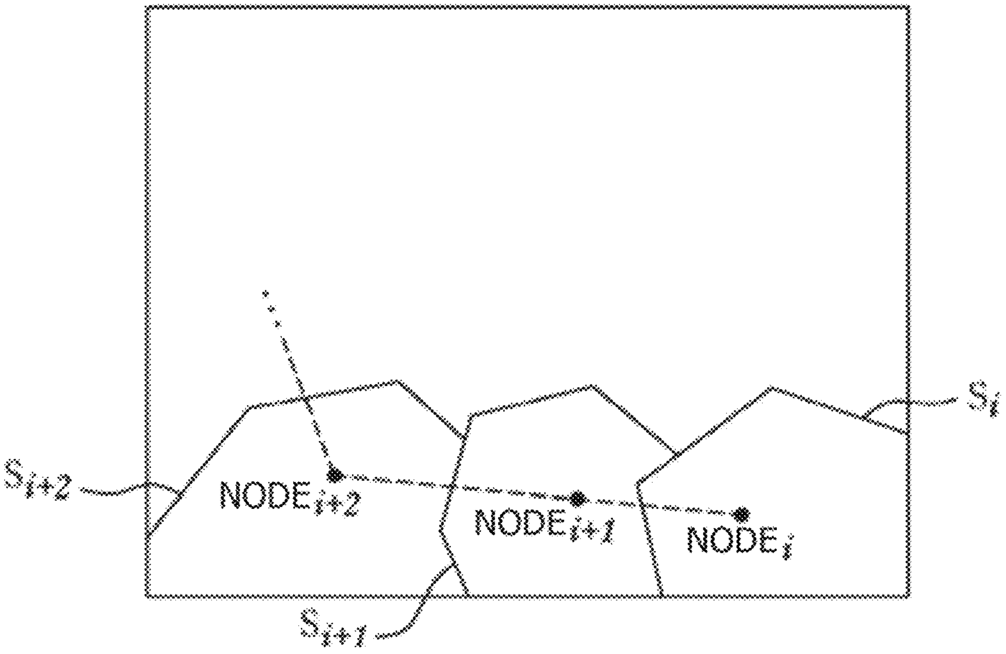
FIG. 8 is a schematic view of the transformation and accumulation concept of light detection and ranging (LiDAR) data.

FIG. 8 is a schematic view showing the concept of transformation and accumulation of LiDAR data, and when a LiDAR scan range is expanded as a node is generated, LiDAR scan data, which corresponds to a scan range confirmed for LiDAR scan data transformed and accumulated by the conventional LiDAR scan, is transformed and accumulated, thereby expanding a map area. That is, in FIG. 8, when pieces of LiDAR scan data by nodes i, i+1, i+2, . . . are accumulated, the LiDAR scan range is also expanded like $S_i$, $S_{i+1}$, $S_{i+2}$, . . . , and thus the map area is also expanded.

However, when the three-dimensional LiDAR scan data is simply brought into the perspective (pose) of the initial node, not only scan data of a static object but also scan data of a dynamic obstacle are returned to the pose of the initial node, and thus it is necessary to remove this. In the present disclosure, whether the map point is a dynamic obstacle is determined by generating a LIDAR depth image and then projecting a map point onto a depth image.

Figure 9:
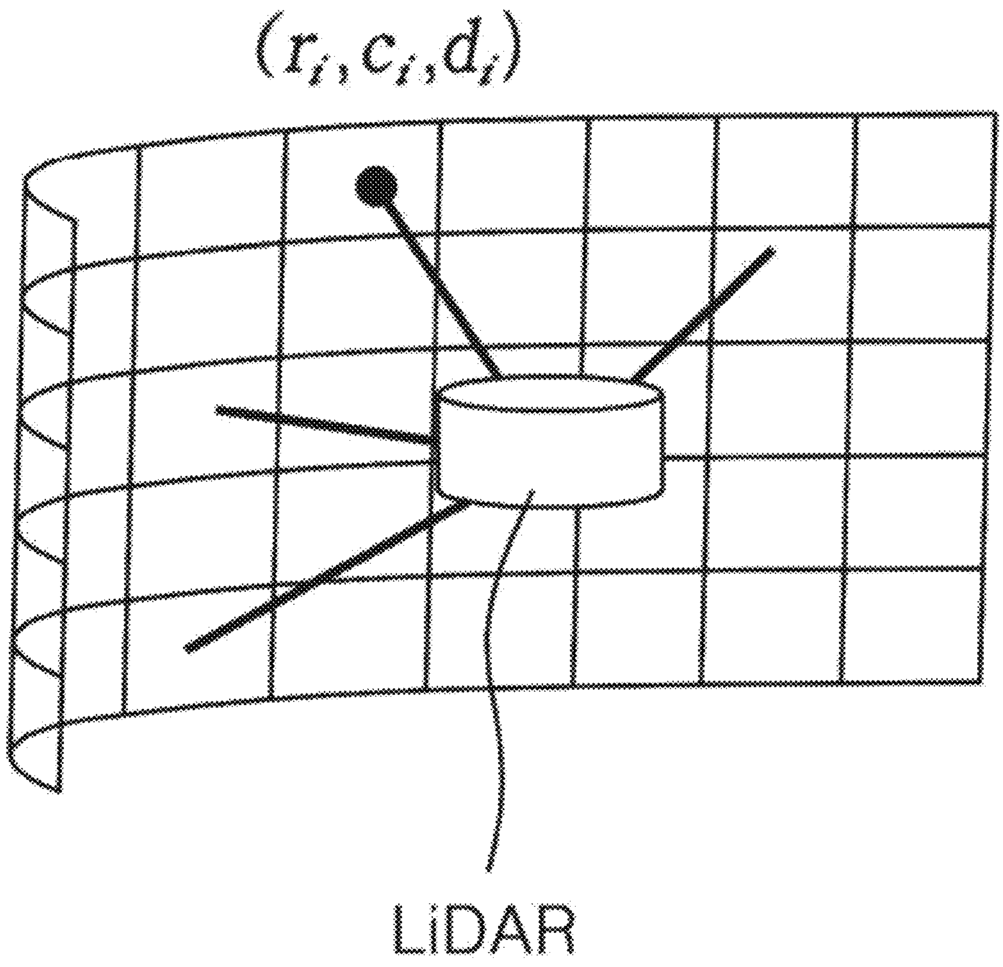
FIG. 9 shows a LIDAR depth image.

The depth image generation module 156 is a component for performing a depth image generating operation (S150) of generating a depth image by processing LIDAR scan data for each of accumulated nodes. The depth image is an image that expresses a distance from a LiDAR to an object by measuring the time it takes for light emitted by the LiDAR to be returned by being reflected from the object. FIG. 9 shows a LiDAR depth image, in which $r_i$ and $c_i$ are pixel coordinates (row coordinate and column coordinate) of a LiDAR point projected onto a depth image, and di is a depth value of the corresponding pixel. LiDAR reflection points $(x_i, y_i, z_i)$ by an object may be transformed into a depth image by [Equation 5] to [Equation 11] below {here, $\text{azimuth}_{max}$ and $\text{azimuth}_{min}$ are maximum/minimum vertical fields of view of the LiDAR, and $\text{azimuth}_{res}$ and $\text{bearing}_{res}$ are vertical and horizontal resolutions of the LiDAR}.

$$r_i = (\text{rows} - 1) \times \frac{\phi - azimuth_{min}}{azimuth_{res}} \quad \text{[Equation 5]}$$

$$c_i = (cols - 1) \times \frac{\theta + \pi}{2\pi} \quad \text{[Equation 6]}$$

$$d_i = \sqrt{x_i^2 + y_i^2 + z_i^2} \quad \text{[Equation 7]}$$

$$\phi = \tan^{-1}\frac{z_i}{\sqrt{x_i^2 + y_i^2}} \quad \text{[Equation 8]}$$

$$\text{rows} = \frac{azimuth_{max} - azimuth_{min}}{azinuth_{res}} \quad \text{[Equation 9]}$$

$$cols = \frac{2\pi}{\text{bearing}_{res}} \quad \text{[Equation 10]}$$

$$\theta = \tan^{-1}\left(\frac{y_i}{x_i}\right) \quad \text{[Equation 11]}$$

Figure 10:
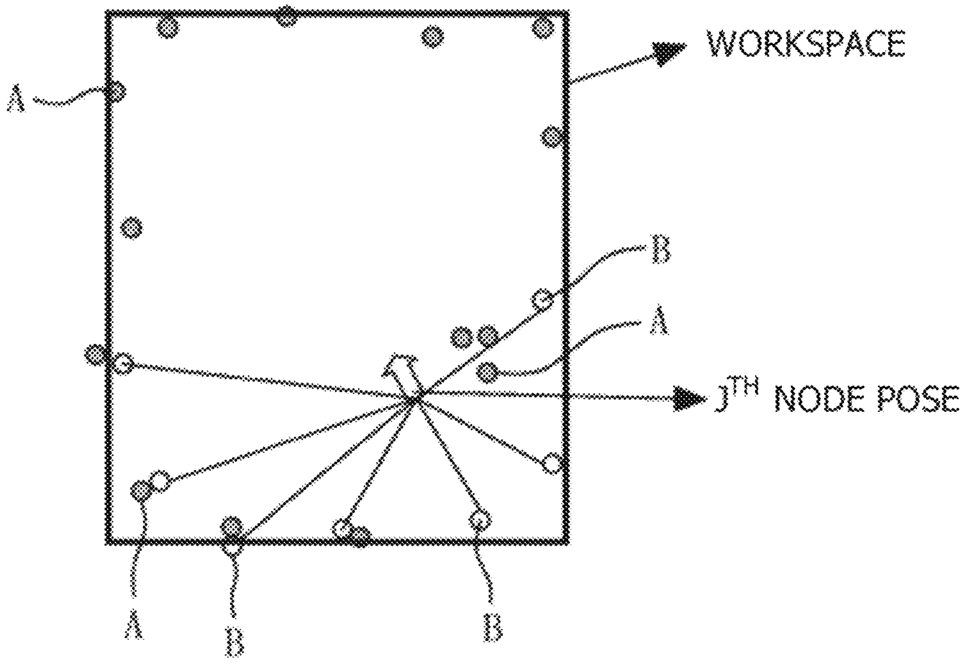
FIG. 10 shows an example of a map for describing an operation of a matching module.

The matching module 157 is a component for performing a matching operation (S160) of comparing map points accumulated on a map with map points newly accumulated by the $j^{th}$ LiDAR scan data and distinguishing matched map points from unmatched map points. Since the map points are accumulated on the map by lidar scan data, the map points in the present invention can be defined as 'points that constitute the map as spatial coordinates of lidar scan data'. FIG. 10 shows an example of a map for describing an operation of the matching module, and a workspace forms the boundary of the map, and map points A accumulated by up to $j-1^{th}$ LiDAR scan data and map points B by the $j^{th}$ LiDAR scan data are marked on the map. That is, the matching operation (S160) is an operation of determining whether there is a point that may be considered as the same map point among the accumulated map points A and the added map points B and separates the accumulated map points A into a group matching the added map points B and a group not matching the same.

Figure 11:
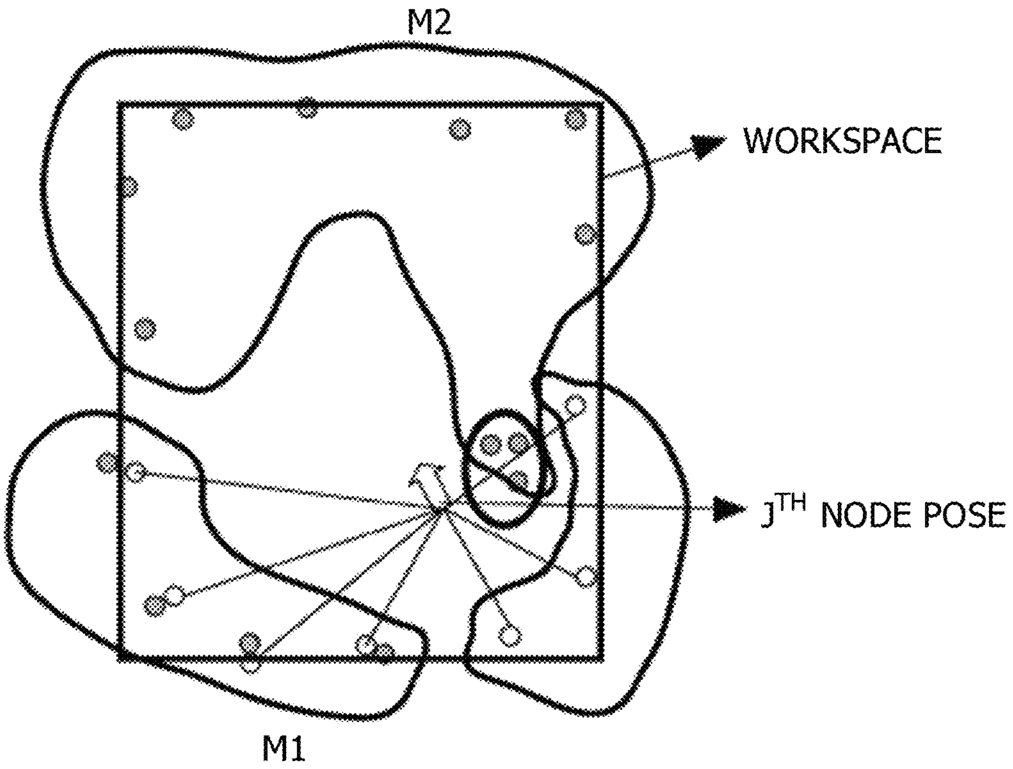
FIG. 11 shows distinguishing a matching group from a non-matching group in FIG. 10.

FIG. 11 separately shows the matching group and the non-matching group in FIG. 10, which is a case where a matching group M1 is formed at the bottom left of the map and a non-matching group M2 is formed at the top of the map. Points at the bottom right of the map are $j^{th}$ scanned points and are a group M3 that does not match the accumulated map points A. There is a high possibility that the matching group is not a dynamic obstacle because the current map points match the map points newly scanned and measured by the LiDAR. In this case, it may be immediately determined that the matching group is a fixed object, but the dynamic obstacle may be located in the workspace for a long time, and when it is immediately determined that the matching group is the fixed object, there is no way to correct the incorrect determination (determining that the dynamic obstacle is a fixed environment), and thus in the present disclosure, it is possible to lower the possibility of such an error by assigning a weight (weigh t) to each map point and then calculating the possibility of the object's existence.

Specifically, a predetermined weight is added to the matching group M1, a predetermined weight is subtracted from the non-matching group M2, and an initial value is assigned to the group M3 that does not match the map points A accumulated as the jth/scanned points. In addition, a possibility p of being a fixed environment (object) is derived from a weight w, and the relational equation is as shown in [Equation 12] below.

$$w = \log\left(\frac{p}{1-p}\right) \quad \text{[Equation 12]}$$

According to [Equation 12], it can be seen that the larger the weight w, the larger the probability p of the fixed environment, and the smaller the weight, the smaller the probability p. The group M3 that does not match the accumulated map points A accumulated as the $j^{th}$ scanned points is added to the map point, and since its existence may be determined by LiDAR scan data after the $j^{th}$, it is appropriate that p=0.5 using w as zero is assigned, and the possibility of M3's existence is unknown at the $j^{th}$ (i.e., it is also qualitatively valid considering p=0.5).

However, in the case of the non-matching group M2, the weight cannot be collectively subtracted. This is because it is impossible to distinguish whether it is simply because there is no $j^{th}$ LIDAR scan data or because it is a dynamic obstacle. To solve this problem, the previously derived depth image is used.

The projection module 158 is a component for performing a projecting operation (S170) of projecting the non-matching group M2 onto the depth image by the $j^{th}$ LIDAR scan and determining whether to subtract the weight. The projecting operation (S170) may include determining that points in the non-matching group M2 ahead of the depth image from the ja LiDAR scan are highly likely to be dynamic obstacles and determining the subtraction of the weight. To this end, it is necessary to compare a depth value in a pixel of the depth image with a distance between the LiDAR and the map point M2, and when a location of the non-matching group M2 is (x, y, z), the distance between the LiDAR and the map point M2 may be obtained after returning to a relative location to the $j^{th}$ node, and thus the distance between the LiDAR and the map point M2 may be derived from [Equation 14] below.

$$\begin{pmatrix} x' \\ y' \\ z' \\ 1 \end{pmatrix} = P_j^{-1} \cdot \begin{pmatrix} x \\ y \\ z \\ 1 \end{pmatrix} \quad \text{[Equation 13]}$$

$$D = \sqrt{x'^2 + y'^2 + z'^2} \quad \text{[Equation 14]}$$

Figure 12:
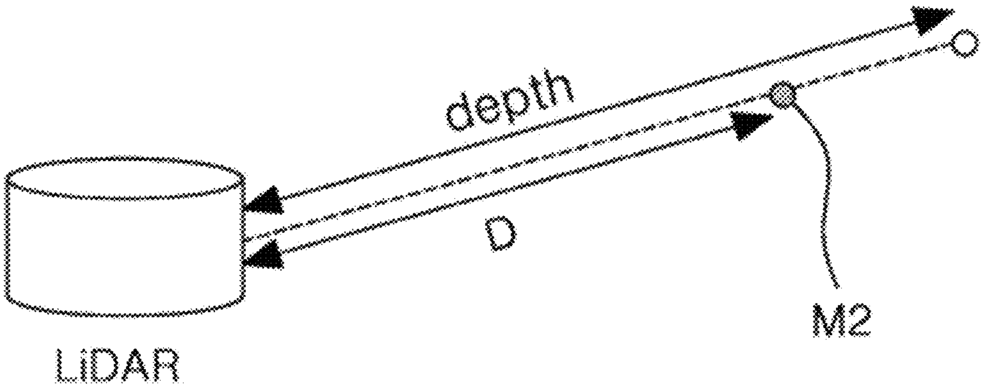
FIG. 12 shows a distance relationship between a depth image and a map point.

FIG. 12 shows the distance relationship between the depth image and the map point, and when the distance between the LiDAR and the map point M2 is smaller than the depth value of the depth image, it is highly likely to be a dynamic obstacle, and thus the weight of the map point of the non-matching group M2 that are in a corresponding pixel ($r_i$, $c_i$) is subtracted, and when the distance between the LiDAR and the map point M2 is larger than the depth value of the depth image, determination is not possible, and thus the weight is not changed.

The weight adjustment module 159 is a component for performing a weight adjusting operation (S180) of increasing and decreasing weights of the matching group M1 and the non-matching group M2 according to the determination of the matching module 157 and the projection module 158 and assigning the initial weight to the group M3 that does not match the map points A accumulated as the $j^{th}$ scanned points.

The map generation module 160 is a component for performing a map generating operation (S190) of returning the remaining map points while the node generating operation (S100) to the projecting operation (S170) are repeated. Whether to return the remaining map points is determined by whether the possibility p of the fixed environment (object) according to [Equation 12] is greater than or equal to a predetermined value, and for example, p≥0.3 may be set. That is, when p<0.3 is established in the LiDAR data transforming and accumulating operation (S140) or the projecting operation (S170), it means that the points are determined to be a dynamic obstacle and are excluded from the return map point. For reference, even when the points are excluded from the return map point in this way, when being re-accumulated as map points by LiDAR scan, the above points are assigned p=0.5 and are determined whether they are dynamic obstacles, and thus even when it is incorrectly determined that a fixed obstacle is a dynamic obstacle, there is room for correction.

Figure 13:
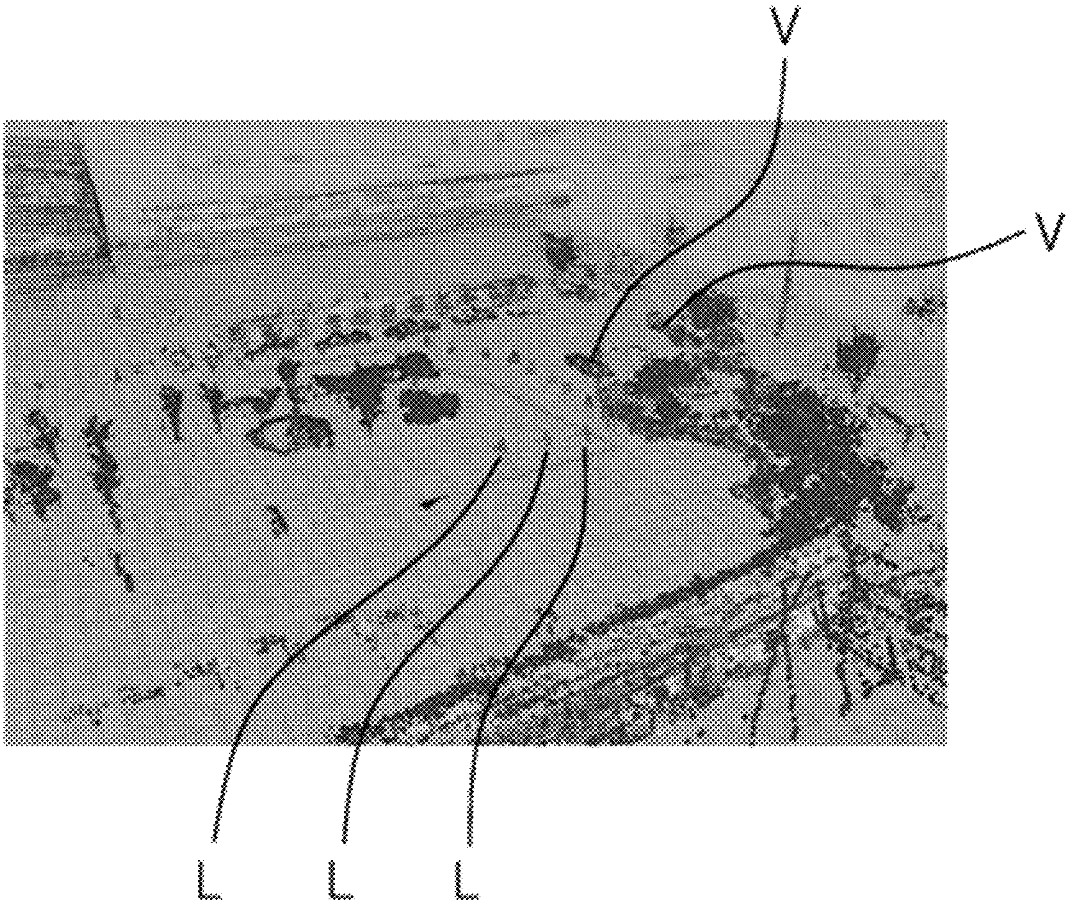
FIG. 13 shows map points returned when dynamic obstacles are not removed.
Figure 14:
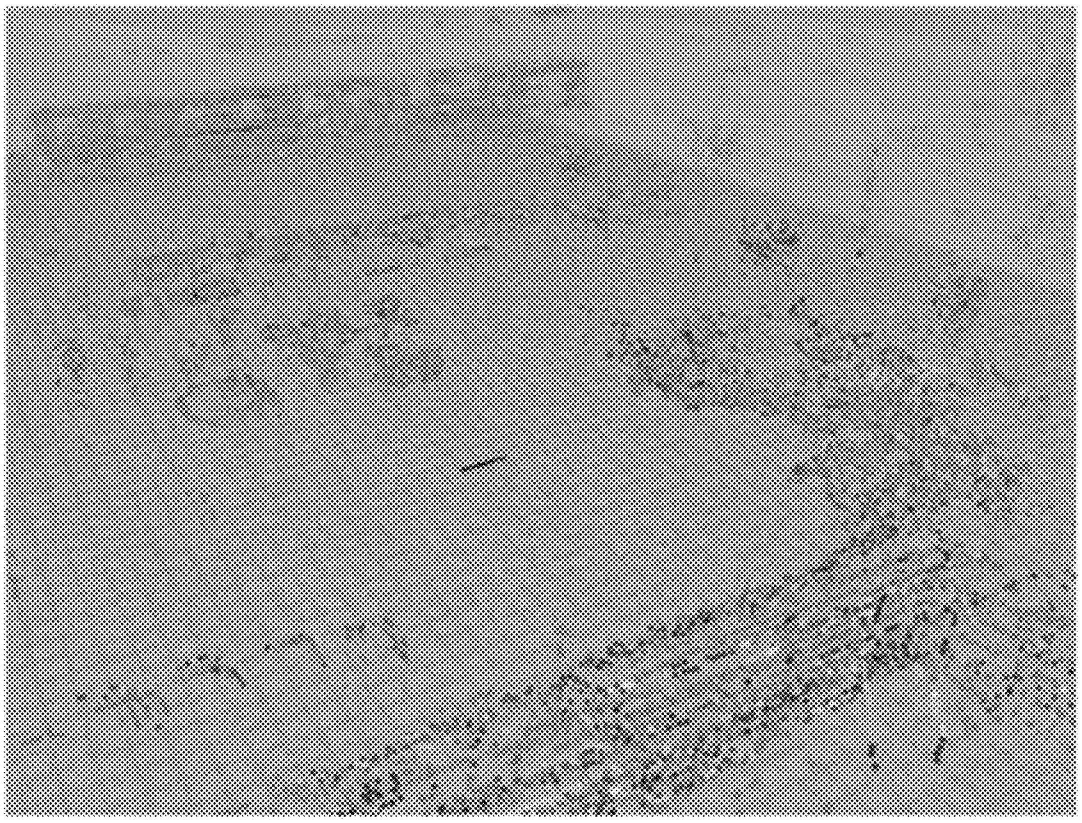
FIG. 14 shows map points returned when dynamic obstacles are removed.

FIG. 13 shows an image of map points returned when dynamic obstacles are not removed, and FIG. 14 shows an image of map points returned when the dynamic obstacles are removed. It can be seen that when the dynamic obstacles are not removed, people L or vehicles V are returned to map points, and thus an accurate map of the workspace is not generated.

DESCRIPTION OF REFERENCE NUMERALS

| | |
|---|---|
| 100: body part | 110: motor |
| 140: power supply board | 150: PC |
| 151: node generation module | 152: motion constraint calculation module |
| 153: loop constraint calculation module | 154: node pose optimization module |
| 155: LiDAR data transformation and accumulation module | |
| 156: depth image generation module | 157: matching module |

-continued

| | |
|---|---|
| 158: projection module | 159: weight adjustment module |
| 160: map generation module | |
| 170: sensor | 180: MOU board |
| 200: transport part | 300: LiDAR part |
| S100: node generation operation | S110: motion constraint calculating operation |
| S120: loop constraint calculating operation | S130: node pose optimizing operation |
| S140: LiDAR data transforming and accumulating operation | |
| S150: depth image generation operation | S160: matching operation |
| S170: projecting operation | S180: weight adjusting operation |
| S190: map generating operation | |

The invention claimed is:

1. A transport robot capable of removing a dynamic obstacle comprising:

a body part (100), a transport part (200) comprising wheels or caterpillars, configured to move the body part (100) according to driving of a motor of the body part (100), and a LiDAR part (300) configured to emit light, detect light in which the emitted light is reflected from an object in a global space, generate a LIDAR scan data, and transmit to the body part (100), wherein the body part (100) includes a PC (150) configured to generate a map of a workspace in which the transport robot is located, and wherein the PC (150) is configured to:

generate a new node when a change in location or direction of the transport robot is a predetermined value or more;

calculate a motion constraint for a previous node with respect to the generated nodes;

calculate a loop constraint for a past node when the past node having an Euclidean distance that is a predetermined value or less with respect to the generated nodes is present;

optimize poses of nodes using a both end node information forming a loop, wherein the both end node comprises the past node and the generated node;

transform three-dimensional LiDAR scan data of each optimized node into location and direction data of an initial node and accumulate the transformed location and direction data;

generate a depth image by processing LiDAR scan data with respect to each of the accumulated nodes;

compare map points accumulated on a map with map points newly accumulated by the LiDAR scan data and distinguish a matched map point from an unmatched map point;

project the unmatched map point onto a depth image by LiDAR scan generating a newly added map point and determine whether a weight is subtracted;

increase and decrease weights of the matched map point and the unmatched map point according to the determination of the PC (150) and assign an initial weight to map points that do not match the map points accumulated as the newly accumulated points; and return the remaining map points while repeatedly performing the steps of transforming three-dimensional LiDAR scan data through determining whether the weight is subtracted;

wherein the PC minimizes the sum of differences in location and direction between nodes connected by a motion constraint, a loop constraint, and the motion and loop constraints to perform node pose optimization.

2. The transport robot of claim 1, wherein, when a possibility (p) derived from a weight (w) of each of the map points according to [Equation 12] below is less than a predetermined value, the PC (150) determines that the corresponding map point corresponds with a dynamic obstacle and if the corresponding map point corresponds to a dynamic obstacle, excludes the corresponding map point from an image of the returned map points.

$$w = \log\left(\frac{p}{1-p}\right). \quad \text{[Equation 12]}$$

3. A method of removing a dynamic obstacle, comprising:

a node generating operation (S100) of generating a new node when a change in location or direction of a transport robot is a predetermined value or more;

a motion constraint calculating operation (S110) of calculating a motion constraint for a previous node with respect to the generated nodes;

a loop constraint calculating operation (S120) of calculating a loop constraint for a past node when the past node having an Euclidean distance that is a predetermined value or less with respect to the generated nodes is present;

a node pose optimizing operation (S130) of optimizing poses of nodes using a both end node information forming a loop, wherein the both end node comprises the past node and the generated node;

a LiDAR data transforming and accumulating operation (S140) of transforming three-dimensional LiDAR scan data of each optimized node into location and direction data of an initial node and accumulate the transformed location and direction data;

a depth image generating operation (S150) of generating a depth image by processing LiDAR scan data with respect to each of the accumulated nodes;

a matching operation (S160) of comparing map points accumulated on a map with map points newly accumulated by the LiDAR scan data and distinguishing a matched map point from an unmatched map point;

a projecting operation (S170) of projecting the unmatched map point onto a depth image by LiDAR scan generating a newly added map point and determining whether a weight is subtracted;

a weight adjusting operation (S180) of increasing and decreasing weights of the matched map point and the unmatched map point according to the determination of the matching operation (S160) and the projecting operation (S170) and assigning an initial weight to map points that do not match the map points accumulated as the newly accumulated points; and a map generating operation (S190) of returning the remaining map points while the LiDAR data transforming and accumulating operation (S140) to the projection operation (S170) are repeatedly performed;

wherein the node pose optimizing operation (S130) includes minimizing the sum of differences in location and direction between nodes connected by a motion constraint, a loop constraint, and the motion and loop constraints.

4. The method of claim 3, wherein, when a possibility (p) derived from a weight (w) of each of the map points according to below is less than a predetermined value, the map generating operation (S190) includes determining that the corresponding map point corresponds with a dynamic obstacle and if the corresponding map point corresponds to a dynamic obstacle, excludes the corresponding map point from an image of the returned map points.

$$w = \log\left(\frac{p}{1-p}\right). \quad \text{[Equation 12]}$$

* * * * *